A. L. CARLSON.
TEA AND COFFEE STRAINER.
APPLICATION FILED SEPT. 12, 1910.
1,015,293.
Patented Jan. 23, 1912.
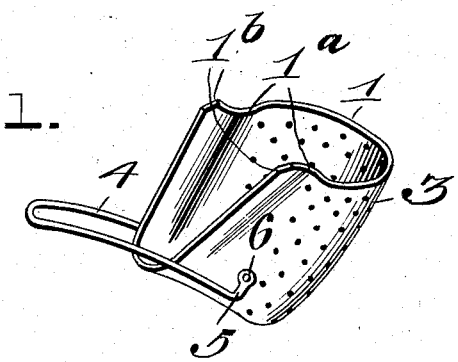
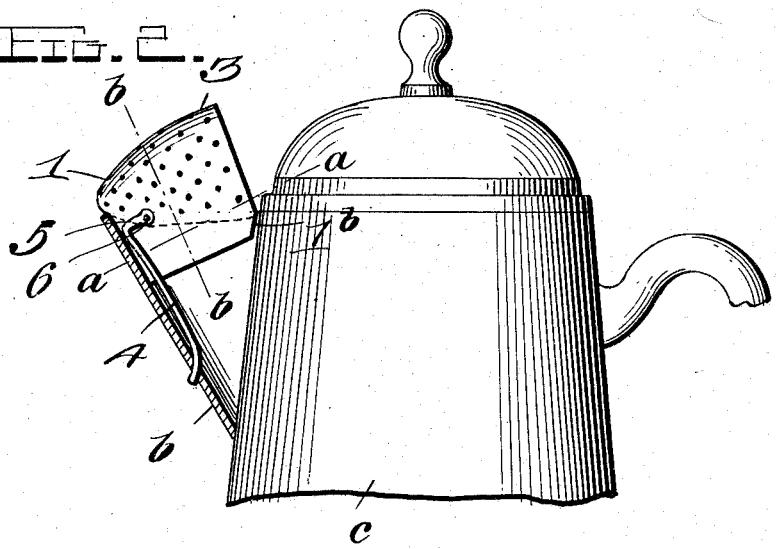
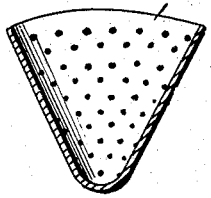
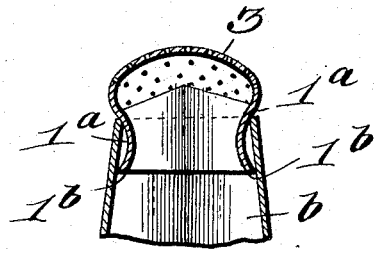
Inventor
A. L. Carlson,
By Watson E. Coleman,
Attorney
Witnesses

UNITED STATES PATENT OFFICE.

AXEL L. CARLSON, OF CENTER CITY, MINNESOTA.

TEA AND COFFEE STRAINER.

1,015,293.  Specification of Letters Patent.  Patented Jan. 23, 1912.

Application filed September 12, 1910. Serial No. 581,483.

*To all whom it may concern:*

Be it known that I, AXEL L. CARLSON, a citizen of the United States, residing at Center City, in the county of Chisago and State of Minnesota, have invented certain new and useful Improvements in Tea and Coffee Strainers, of which the following is a specification, reference being had to the accompanying drawings.
This invention is an improved strainer for use in the spout of a coffee pot or tea pot, for straining the coffee or tea as the same is poured, the object of my invention being to provide a cheap, simple and very serviceable device of this kind which may be readily placed in the spout of a coffee or tea pot and is provided with a clamping jaw to engage the outer side of the coffee or tea pot spout and secure the strainer therein and yet so that the strainer may be readily detached from the spout when desired.

My invention consists in the construction and arrangement of devices hereinafter described and claimed.
In the accompanying drawings,—Figure 1 is a perspective view of a coffee and tea strainer constructed in accordance with my invention. Fig. 2 is an elevation of the same, showing the strainer within the spout of a coffee pot, said spout of the coffee pot being shown in section. Fig. 3 is a transverse sectional view of the same on the plane indicated by the line A—A of Fig. 2. Fig. 4 is a longitudinal sectional view on the plane indicated by the line b—b of Fig. 2.

In accordance with my invention, I provide a substantially trough shaped body 1, of such size and shape as to adapt the same to be fitted in the lower side of the spout b of a coffee or tea pot c. The said body is made of springy sheet metal so that the sides of the body spring outwardly in opposite directions. The said body extends a suitable distance in the spout, and as above indicated bears against the bottom thereof on its inner side. The side walls 1ª of the body converge downwardly and are outturned as at 1ᵇ, at their inner edges, so as to provide outwardly inclined side flanges on the said walls, which bear by reason of the elasticity of the body against the sides of the spout and effect a substantially water tight connection between the side walls of the body and the sides of the spout. The trough shaped body is adapted to be readily fitted in and removed from the spout of the pot, as will be understood.

At the outer end of the trough shaped body, is a foraminous pouring lip 3, which extends from side to side of the body and projects beyond the outer end of the spout. This pouring lip may be either integral with the trough shaped body of the strainer as here shown, or may, if preferred, be composed of wire fabric of suitable size and mesh. I do not desire to limit myself in this particular. The outer end of the pouring lip is inclined and converges downwardly to the outer end of the bottom of the trough shaped body. The latter is provided with a clamping spring 4 which is here shown as comprising a substantially U-shaped spring wire of suitable gage, the bight portion of which is adapted to bear against the outer side of the spout, on the lower side thereof, the ends of the clamping spring being upturned, bearing against opposite sides of the body of the strainer as at 5, and being here shown as secured thereto by means of suitable rivets 6. The clamping spring may, within the scope of my invention, be of any suitable construction, and it may be secured to the body of the strainer by any suitable means. I do not desire to limit myself in these particulars.

While I have herein shown and described a preferred embodiment of my invention, I would have it understood that modifications may be made within the scope of the appended claim.

I claim:—

The herein described strainer comprising a substantially trough shaped body having downwardly converging side walls to fit in the lower side of the spout of a coffee or tea pot, the said body being open at its inner end and provided at its outer end with a foraminous pouring lip extending from and connecting the bottom and the side walls thereof and adapted to project beyond the outer end of the spout to which the strainer is applied, the strainer being further provided with a U-shaped clamping spring, the ends of which are secured to the sides of the strainer, the bight portion of said spring being adapted to engage the outer side of the spout and secure the strainer detachably in place therein.

In testimony whereof I hereunto affix my signature in the presence of two witnesses.

AXEL L. CARLSON.

Witnesses:
ALFRED P. STOLBERG,
ROZETTA V. JOHNSON.

---

Copies of this patent may be obtained for five cents each, by addressing the "Commissioner of Patents, Washington, D. C."